June 20, 1967 H. T. MERYMAN ET AL 3,326,458
CONTAINER AND PROCESS OF STORING BLOOD
Filed May 28, 1965 3 Sheets-Sheet 1
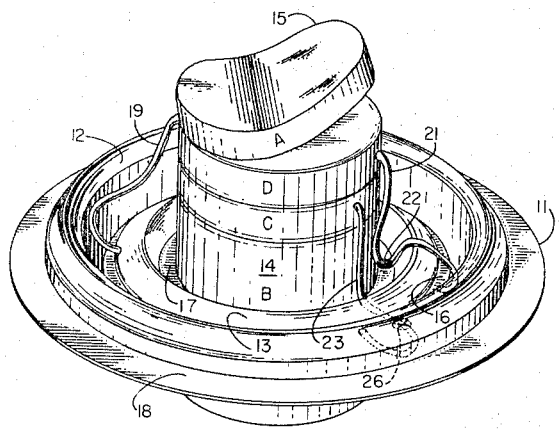
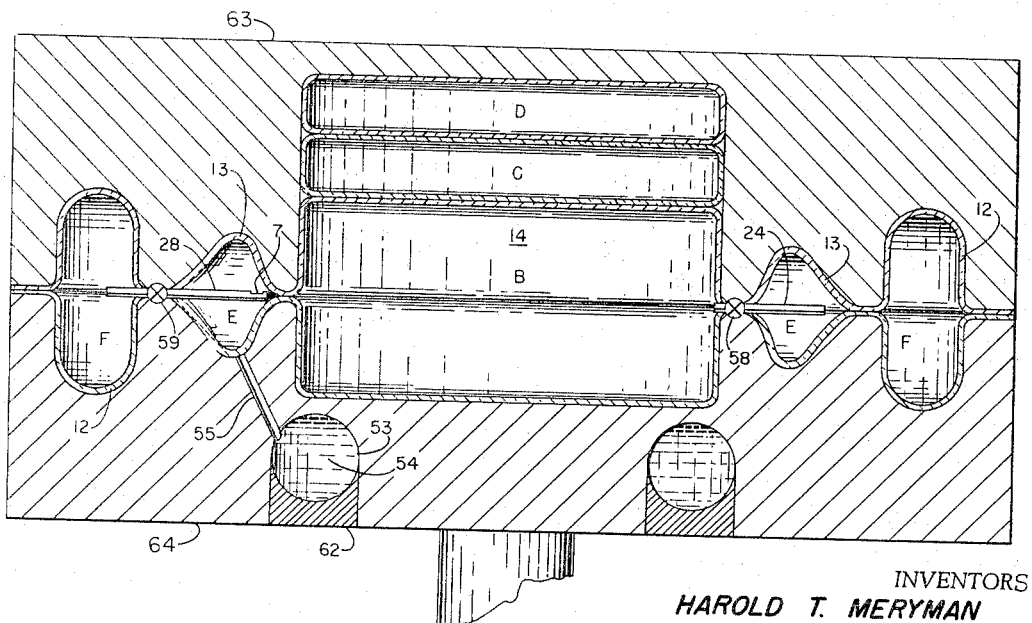
INVENTORS
HAROLD T. MERYMAN
JOSEPH W. SAUR
BY *Melvin L. Crane* AGENT
ATTORNEY

INVENTORS
HAROLD T. MERYMAN
JOSEPH W. SAUR

United States Patent Office 3,326,458
Patented June 20, 1967

3,326,458
CONTAINER AND PROCESS OF STORING BLOOD
Harold T. Meryman, Sandy Spring, and Joseph W. Saur, Rockville, Md., assignors to the United States of America as represented by the Secretary of the Navy
Filed May 28, 1965, Ser. No. 459,959
9 Claims. (Cl. 233—27)

The invention described herein may be manufactured and used by or for the Government of the United States of America for governmental purposes without the payment of any royalties thereon or therefor.

The invention relates to a process and apparatus for treating red blood cells to liberate them from contaminating components, and more particularly, to an improved blood preservation process and to a novel container wherein the entire process is performed in a closed, sterile environment.

Various techniques for the preservation of whole blood have been based on the knowledge that at temperatures below −100° C. the biological reaction rate beomes negligible and long-term preservation is possible. It has also been known that to prevent excessive destruction of cells (hemolysis) during freezing and thawing, a protective additive, such as glycerol, glucose, lactose, dextran, polyvinylpyrrolidone, etc. may be added to the blood medium before freezing. However, even with the use of these additives, it has not been possible to freeze and thaw a unit of blood without some evidence of cell destruction. The addition of a large amount of protective substance will reduce the cell loss to an insignificant level; for example, glycerol in the range of about 30% concentration almost completely prevents hemolysis during the freezing and thawing of red cells.

The presence of a protective additive in blood which is to be transfused into the veins of a patient is not clinically acceptable because (1) some additives cannot be tolerated by the recipient in the concentrations necessary to protect erythrocytes from freezing injury; or (2) additives penetrate the red cell membrane slowly so that erythrocytes containing additive are osmotically hypertonic in relation to the circulating blood and hemolyze on transfusion. In the present state of the art, it is therefore necessary that the protective additives which are included with erythrocytes to be preserved by freezing be removed from the cell suspension prior to infusion into the recipient.

Hemolysis may be defined as the breakdown of red cells with the liberation of their hemoglobin into the suspending medium. Although the maximum levels of free hemoglobin that can be tolerated in the circulation have not been established, there is no question but that only very small amounts will be acceptable in transfused blood, particularly since many transfusions involve multiple units and even a small amount of hemolysis in each unit can result in the accumulation of substantial free hemoglobin in the recipient. Some free hemoglobin is bound to haptoglobins in the plasma and is removed from the circulation through the reticulo-endothelial system. Much of the remaining free hemoglobin is excreted through the kidneys to appear in the urine as hemoglobinurea. Under certain conditions the concentration of hemoglobin by the kidney can result in the formation of hemoglobin crystals in the renal tubules leading to renal failure which can be lethal. It is therefore essential that any process for the preservation of blood by freezing include provisions for removing any free hemoglobin that may be present following freezing and thawing.

Experience with blood processing indicates that the following conditions should be satisfied in order for transfusable blood to be clinically acceptable:

(1) The red cells of the blood must remain in the circulation and continue to function following transfusion. Although this property is influenced by the freezing and storage procedure, it is probably not related to the washing process and is therefore not germane to this invention.

(2) The blood must be free of all abnormal constituents such as free hemoglobin or protective additives and the cells must be sufficiently osmotically stable so that no hemolysis will take place during or immediately following transfusion.

(3) Standards for blood processing require that the blood be extracted from the donor under sterile conditions and that the container in which it is stored remain unopened until the time of administration. A limit of 24 hrs. storage time is imposed on a container which has been opened. The introduction of any additive or wash solution into a closed, sterile container containing blood would be regarded as a break in the sterile conditions existing in the closed space. Where solutions necessary to the preservation of the blood must be added, it is desirable that they be introduced into the blood handling container and sterilized in situ prior to the withdrawal of blood from the donor.

(4) The volume of materials required for blood processing is an important factor. The volume of additive and wash solution should be kept to a minimum to avoid imposing excessive logistic problems on the distribution and use of the blood.

In view of the foregoing, the present invention provides an improved process for treating red blood cells with additive solution and with wash solution in a manner which effectively removes both free hemoglobin and the protective additive from the cell suspension and restores the cells to a normal isotonic condition prior to transfusion. The present process also includes freezing and thawing operations for the long term preservation of red cells; said operations in combination with the wash treatment produce a reconstituted blood which is readily transfusable in that it contains no clinically controversial constituents. Furthermore, the volume of wash solution required in this process is sufficiently small so that consideration can be given to including the wash solution in the container in which the blood will be frozen and stored so that it will be unnecessary to enter the container and break the sterile conditions at the time of washing.

In arriving at the above desired end, the blood process described herein is carried out in a sealed container under constant aseptic conditions. The various treatments and processing steps, including freezing, storage, thawing and washing of frozen cells, are being performed sequentially without entry into the aseptic field. The concept of a closed environment for carrying out an entire process with a high degree of reliability under sterile conditions, and the associated concept of pre-packed additives, wash solutions and reconstituting medium which are utilized sequentially in a closed environment has been achieved by means of the novel apparatus, described more fully in the detailed description that follows.

It is therefore an object of the present invention to provide an improved method for the preservation of red blood cells stored in the frozen state and restored following thawing and washing to clinically prescribed levels of acceptability.

Another object of the invention is to provide a novel apparatus wherein preservatives, washing solutions and other media may be stored under aseptic conditions and utilized in processing blood for long term storage.

Still another object is to provide a centrifuge designed for particular use with a plastic liner that forms a sealed container for performing a series of treatments on red blood cells.

Yet another object is to provide a versatile method for introducing solutions under aseptic conditions to a cell suspension during centrifugation and for discharging the supernatant from said suspension without a break in the aseptic conditions.

Other objects and advantages of the present invention will appear from the following specifications and accompanying drawing and the novel features thereof will be particularly cited in the annexed claims.

In the accompanying drawings:

FIG. 1 is a perspective view of the novel container of the invention;

FIG. 3 is a cross section showing the container enclosed in the centrifuge mold and illustrating a further provision in discharging the supernatant from the cell suspension.

Figure 2:
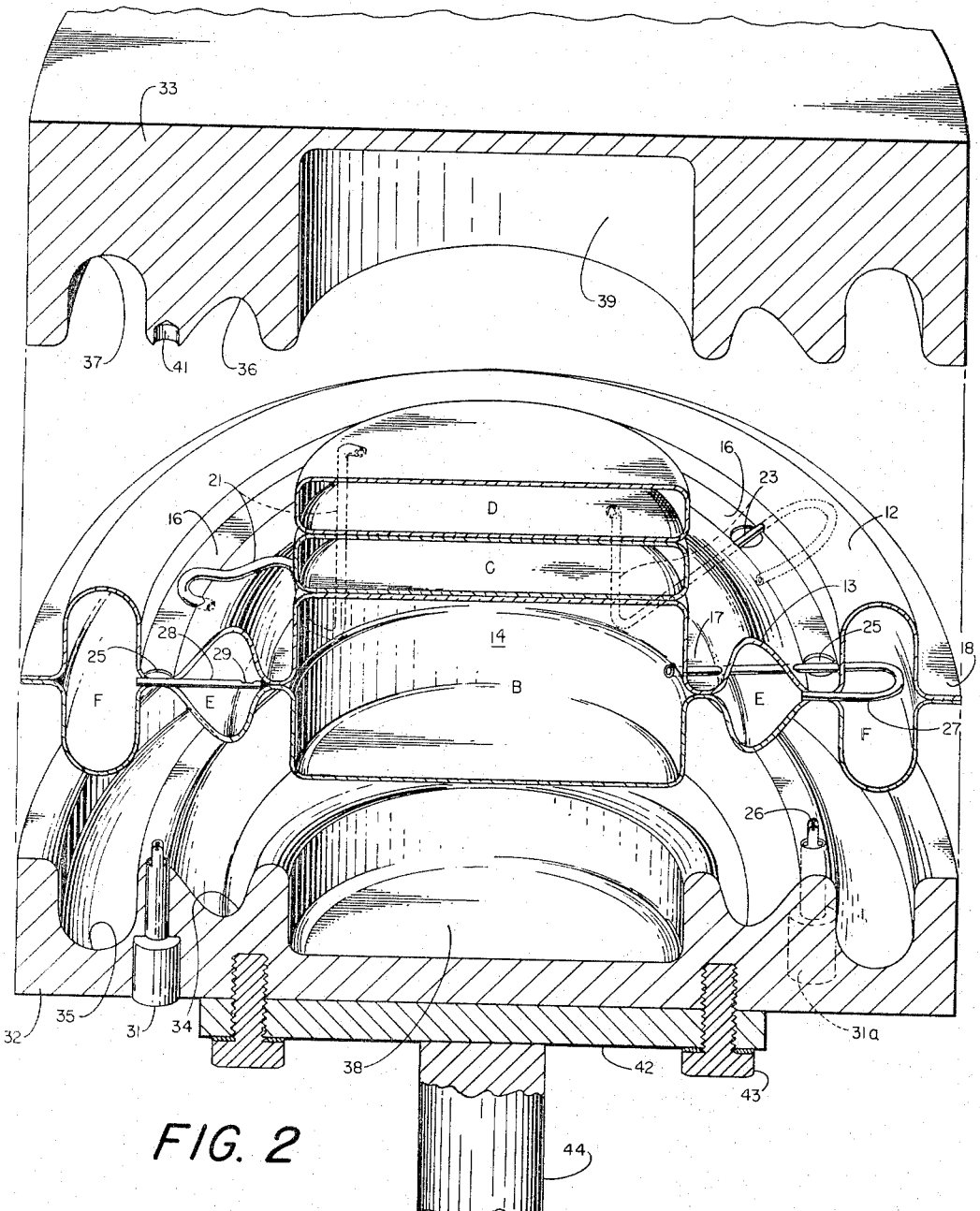
FIG. 2 is a cross section in perspective of a centrifuge arrangement blown out to show the contoured halves of a mold that retains the container in position during centrifugation.

In accordance with the present invention a suspension of red cells is treated with wash solutions and centrifuged to remove contaminants, such as free hemoglobin, and chemical preservatives. The wash solutions employed for this purpose are adjusted to an osmotic pressure which permits preservative to pass out of the cells restoring them to osmotic equilibrium with a transfusible medium. An initial dilution is performed with an additive free hypertonic solution to induce the cells to lose intracellular additive and contract to a lesser volume. Subsequent washings are then carried out with isotonic saline solution.

It has been determined that the rate at which hemoglobin is washed from a cell suspension depends to a very large extent on the amount of extracellular fluid. Wash treatments may best be performed by initially reducing the extracellular fluid volume to a minimum, thus in effect reducing the amount of wash solution which is required to achieve efficient and thorough washing.

In the past, the introduction of glycerol to a cell suspension prior to freezing and removal of the same after thawing has been a laborious process. In practice, cells were separated from their plasma and then resuspended in a period over one hour into a gradually increasing concentration of glycerol in saline until a total concentration of 50% glycerol was obtained. After thawing, the cells were washed with a stepwise decreasing concentration of glycerol in saline for a period of an hour or more. At high concentrations of glycerol, there is generally a poor sedimentation of cells because the density difference between cells and the suspending medium is negligible; consequently, separation of cells by centrifugation results in considerable spillage of cells into the washings even though the washing is carried out very slowly over a long period of time. By introducing, following thawing, a first step consisting of dilution of the cells with a hypertonic additive-free (or additive-low) solution, sedimentation is improved both by reducing the density of the suspending fluid and by slightly shrinking the cells, making them more dense.

Although glycerine passes rapidly through red cell membranes, it passes less rapidly than water. Cells equilibrated with about 25–30% glycerol are momentarily hypertonic and cannot be washed with glycerol-free isotonic solution. This is an additional reason for conducting the initial washing with a hypertonic solution. A suitable hypertonic solution, by way of example, may consist essentially of 5% glycerol, 2.5% sucrose and 1% sodium chloride, based on the final volume of solution. The cells are then washed with isotonic saline (sodium chloride). The washed cells are then reconstituted in their original plasma, in other suitable suspending medium, or left for brief storage in the isotonic saline.

Referring now to the drawings wherein the same reference characters refer to like parts throughout the drawings, there is shown in FIG. 1 for illustrative purposes only, a novel compartmented container 11 formed of a clinically acceptable plastic material, such as polyvinyl chloride, polycarbonate or polyurethane that can be readily sterilized and that is not detrimental to the viability of desired cellular components to be admitted therein. The novel container comprises three compartments, a central cylindrical compartment, B, surrounded by concentric circular, somewhat oval in cross-section compartments 13(E), and 12(F). The novel container is formed by two identical preformed halves which are placed one over the other and then sealed, about the periphery, between compartments 12 and 13, and between compartment 13 and B, to form the separate concentric circular compartments 13(E), 12(F), and cylindrical compartment B. Other chambers or compartments C, D and A are formed with the same radii as compartment B and assembled above compartment B as separate chambers. Compartments B, C, D, and A form a stack of plastic bags or cylindrical compartments which are identified as stack 14.

The outer circular chamber 12(F) is destined to retain washing wastes therein whereas the chamber 13(E) forms an inner processing chamber which contains the red blood cells during treatment and in which the cells are preserved during freeze-storage. The central compartments or chambers 14 (B, C, D and A) contain various sterile solutions for cell treatment and also the reconstituting medium in which the treated cells are to be resuspended. The various compartments of the central stack 14 have been labeled A, B, C, and D for ready reference. The compartments are formed with plastic tubes from the various compartments to other preferred compartments in order to carry out the process of treating and preserving the blood for use after having been frozen. The interconnection between the compartments and tubes will be set forth later in the description thereof.

In order to accept the blood from a donor and to preserve the blood for reuse, the blood must be mixed with certain solutions and washed which solutions are contained in the stack of compartments B, C, D, and A and the concentric compartment 13(E) within which the blood cells are stored. In stack 14, compartment A contains an anticoagulant solution into which the blood is initially drawn from the donor. This compartment is connected to the blood washing chamber, E, by tube 19. Compartment C is connected with compartment E via tube 23 and contains a hypertonic diluting solution which will be added to the cells in compartment E after they have been frozen and thawed for use. Compartment B contains an isotonic wash solution which is used to wash cells during the centrifugal phase of the process. Compartment B is connected to compartment E through tube 27. Compartment D, is connected to compartment E via tube 23 and contains a solution in which the cells will be resuspended for use following washing. Compartment F is designed to receive the waste solution produced by the washing of cells in compartment E. Connection between these two compartments is achieved through tube 28.

All the tubes are closed by pinch clamps. An example of these can be seen in clamp 26 which projects through opening 25 in surface 16, FIG. 2. The valve may be electrically, mechanically or pneumatically activated, as is now well known in the art, to release the clamp during centrifugal action and permit wash solution to flow.

FIGS. 1 and 2 illustrate features of the novel container including separate compartments, as shown at 15 (FIG. 1) for the yieldably separating bag A, which may be detached from the central stack and appropriately suspended in an elevated position to transfer a fluid content by means of gravity flow. Bag A, which initially contains an anticoagulant therein, is utilized as a temporary storage vessel for blood received from a donor or from other sources. When the blood is to be processed, the bag is pulled off the stack and suspended vertically for a period of time until the red cells have sedimented to the lower part of said bag. The sedimentation may be accelerated by the addition of some compound such as gelatine, which causes the cells to agglomerate and settle more rapidly. Alternatively, the entire assembly can be centrifuged. The sedimented cells are then transferred from the bottom of bag A through tube 19 into the processing chamber 13(E) where the cells are treated in accordance with the invention. After the cells have been transferred from bag A, tube 19 is sealed off and severed near the inlet to chamber 13, and the plasma remaining in bag A is thus salvaged for other use.

Separating chamber 12 from chamber 13 is a flat, annular surface or area 16 which joins said chambers across the horizontal axis (shown more plainly in FIG. 2). Chamber 13 is similarly separated from central stack 14 by a flat, annular surface 17. A peripheral margin 18 surrounding the present plastic container provides positive anchorage within a centrifuge, as will be explained in greater detail in the treatment cycles in carrying out the process.

In order to support the flexible plastic container during centrifugation, the centrifuge apparatus includes a retainer comprising a lower support member 32 and an upper clamping member 33, said members having contoured surfaces that conform to the configuration of said container. When joined together, said members are capable of retaining said container in fixed position therein during centrifugation. Curved surfaces 34 and 36 in said retainer surround chamber E; curved surfaces 35 and 37 surround chamber F, and cylindrical depressions 38 and 39 surround the central stack 14. Valves 31 and 31a are positioned within recesses in supporting member 32; the upper ends of said valves are retained within indentations, such as the one shown at 41. The lower member is rotatably mounted on support plate 42 by a series of bolts 43, the centrifuge mechanism being adapted to rotate shaft 44 at speeds of between 1000 r.p.m. and 3000 r.p.m.

Figure 4:
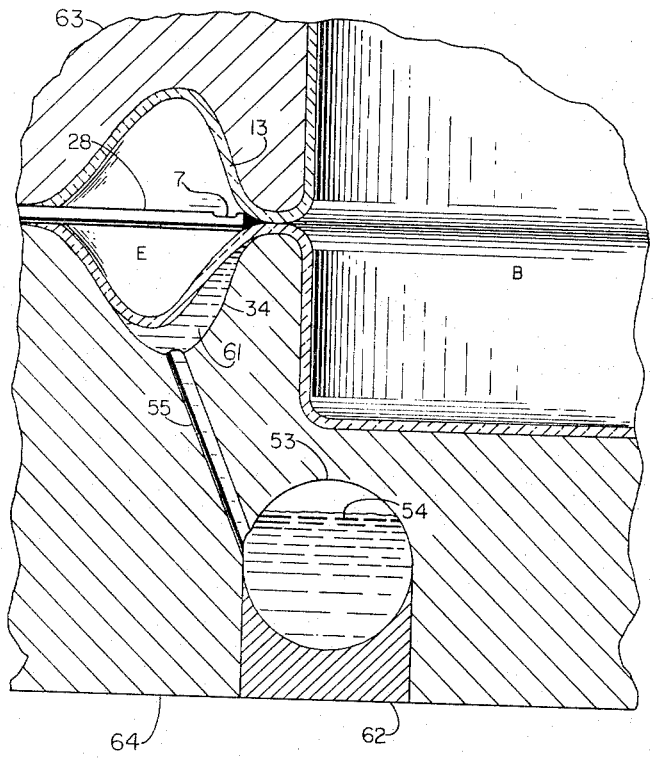
FIG. 4 is an enlarged cross section of a portion of the mold shown in FIG. 3 demonstrating the function of the compressing fluid during centrifugation.

Referring now to the modification illustrated by FIGS. 3 and 4, the centrifuge retained with upper member 63 and lower member 64 is shown in clamped position, the plastic assembly forming a liner therein. In said lower member, below the center stack 14 is an annular channel 53 containing a compressing liquid 54 which is lighter than water. The channel communicates with the hollow cavity 61 that contains chamber E through a passage 55. In the present embodiment when centrifugal force developes during rotation, the fluid in 53 will pass from channel 53 through passage 55 into the hollow cavity 61 compressing the plastic chamber 13. The plastic chamber collapses as supernatant drains away through open valve 59 in drain line 28 to chamber F and is replaced by an equal volume of compressing fluid from channel 53 flowing through passage 55 into the hollow cavity 61, thus collapsing chamber E. Channel 53 holds exactly 250 cc. of compressing fluid which may be either more or less dense than blood and when all of said fluid has flowed into the hollow cavity F, the removal of supernatant will come to an end.

Following the removal of supernatant in the manner described above, overflow valve 59 is closed and wash valve 58 in line 24 between chambers B and 13 is opened. Clean wash fluid flows from compartment B through tube 24 to the outer edge of chamber E. Since the head of pressure of this wash solution is greater than that exerted by the compressing fluid, the wash solution will flow into chamber E thus displacing the compressing fluid forcing the compressing fluid back through passage 55 into channel 53. When the cells in chamber E are completely mixed with wash solution, valve 58 is closed, and the cells are then allowed to sediment, the wash solution subsequently flowing into disposal chamber F through opened valve 59.

The wash treatments may be converted from a sequential sediment to a continuous flow wash. This would be achieved by opening both valves 58 and 59 simultaneously. Wash solution will then flow through tube 24 to the outer edge of chamber E and will mix with the cells, while the discharged supernatant is removed through overflow opening 7. A calibrated constriction in tube 24 will control the rate of wash to prevent cells from being discharged with the supernatant.

In complete operation, the following sequence of events is anticipated. The complete assembly contains, prior to receiving blood from the donor, the following solutions which have been sterilized in situ. Chamber A contains anticoagulant solution sufficient to treat one unit (500 ml.) of whole blood. Container D has a total volume of 500 ml. and contains 250 ml. of resuspending solution if this is to be different from the wash solution. Chamber C contains 250 ml. of hypertonic first dilution solution. Chamber B contains approximately one liter of wash solution such as isotonic sodium chloride. Chamber E has a volume of 500 ml. and contains 250 ml. of protective solution such as glycerin made isotonic with added electrolyte or carbohydrate. Chamber F is empty.

500 ml. of blood are drawn from the donor into Chamber A. The cells are then either allowed to sediment spontaneously or the entire assembly is centrifuged and the packed cells, roughly 250 ml. in volume, are transferred through tube 19 into Chamber E by opening the pinch clamp on tube 19 during centrifugation. Tube 19 is then heat sealed at two points, severed between the seals and container A, which now holds the remaining plasma, is removed for other use. The cells have now been mixed with an equal volume of protective solution in Chamber E. The entire assembly less Chamber A is then frozen and stored.

In preparation for transfusion, the assembly is removed from the freezer and thawed in warm water. The assembly is then placed in the centrifuge. The cells in Chamber E are sedimented, the pinch clamp at 59 on tube 28 is opened and the supernatant expressed into Chamber F. Pinch clamp on tube 28 is closed. The pinch clamp on tube 23 from Chamber C is then opened permitting the first hypertonic diluting solution from compartment C to mix with the cells. With the centrifuge in continuous rotation, the cells will then sediment and the final wash with solution from compartment B can be carried out. There are two alternative methods by which this washing may be conducted: continuous flow wash and sequential dilution.

To conduct continuous flow wash, the clamp on both tubes 27 and 28 at 25, FIG. 2, are opened. Wash solution from Chamber B flows into the peripheral edge of Chamber E, mixing with the cells which have been partially sedimented. As wash solution from Chamber B enters Chamber E, an equivalent amount of supernatant is displaced through tube 28 into Chamber F. If the flow of wash solution from Chamber B is suitably adjusted by a preformed constriction in tube 27, the rate of wash will be such that the sedimentation of cells in Chamber E will be exactly equal to the rate that they are moved centrally by dilution with wash solution so that an equilibrium will be established and the interface between the cell suspension and the supernatant will remain stationary.

Following the completion of washing, the final supernatant is displaced by the flow of fluid 54 into space 61, FIG. 4, and the pinch clamp, 58, is closed. When the centrifuge is stopped and the apparatus opened, fluid 54 will drain by gravity back into channel 53.

Where wash by sequential dilution is desired, this can be achieved by alternately opening the pinch clamps on tubes 27 and 28. When tube 27 is opened, wash solution will flow into Chamber E and mix with the packed cells.

When this tube is closed and tube 28 opened, the supernatant will be displaced into Chamber F by the mechanism previously described.

Following the completion of washing, the supernatant is expressed from Chamber E and the centrifuge stopped. The assembly is removed from the centrifuge, compartment D is separated from stack 14 but remains connected with compartment E by tube 21. The assembly can then be positioned so that the washed, packed cells in compartment E flow into compartment D to mix with the resuspension solution. Tube 21 is then sealed, severed and Chamber D removed for refrigerated storage and ultimate transfusion. The remainder of the assembly is discarded.

Of particular significance of the present method is the efficiency that can be achieved in washing red cells. Due to the existence of velocity gradients based on various distances from the center, extreme turbulence is produced within the cell phase when wash solution is entering into the processing chamber. This turbulence produces virtually perfect mixing of cells with the incoming wash solution. Analysis of the rate at which hemoglobin is washed from a cell suspension indicates that the efficiency of the present method depends essentially on the total volume of extracellular liquid present in the processing chamber. The introduction of a quantity of wash solution equal in amount to the extracellular liquid in the cells will reduce the concentration of any solute by roughly one-third.

Thus, it is apparent that this invention provides a novel apparatus for treating red cells, which apparatus results in improved cell treatment, closed-system sterility and ease of operation. By utilizing the present process, cells may be treated to overcome hemolysis and provides long-term preservation of red cells that can be reconstituted to clinically acceptable levels of transfusible blood.

In order to provide a process of receiving blood, processing for storage and processing for reuse, it is important that the process be done under sterile conditions. Storing the wash solution and resuspension solution in separate containers with the blood results in the least amount of handling and a closed sterile environment; however, if desired for space saving reasons the wash solution in compartment B, the compartment C containing the hypertonic diluting solution, and the compartment D may be removed prior to storage and added after thawing of the blood and connected properly as described above. However such subsequent addition of fluid and fluid chambers will constitute violation of the sterile field possibly resulting in limitation of post-thaw refrigerated time, requiring quicker use of the thawed preserved blood.

Obviously many modifications and variations of the present invention are possible in the light of the above teachings. It is therefore to be understood that within the scope of the appended claims the invention may be practiced otherwise than as specifically described.

What is claimed is:

1. A container for storing and processing blood for reuse after storage, in which:
   said container includes a main body portion,
   said main body portion comprises a central compartment and first and second separate compartments surrounding said central compartment, and
   at least one compartment stacked upon said central compartment of said main body portion and interconnected thereto.

2. A container as claimed in claim 1, in which:
   said main body portion of said container is formed of first and second identical preformed half-sections each containing one half section of each of said compartments of said main body portion,
   said first and second sections mating to form a unitary body.

3. A container as claimed in claim 2, in which:
   a passage is included between said central compartment and said first compartment surrounding said central compartment, and
   a passage is included between said first compartment and said second compartment.

4. A container as claimed in claim 3, which includes:
   at least two separate compartments stacked above said central compartment of said main body portion in axial alignment therewith and interconnected therewith.

5. A container as claimed in claim 4, wherein:
   each of said compartments stacked upon said central compartments are connected by separate suitable tubular members with said first compartment surrounding said central compartment of said main body portion.

6. A container as claimed in claim 5, wherein:
   each of said compartments positioned upon said main body and each of said passages are formed of a plastic material.

7. A process of treating, storing and preparing red blood cells for reuse which comprises:
   positioning a mixture of anticoagulant with blood received from a donor in a vertical position until the red blood cells sediment to the bottom of the container holding the mixture,
   transferring the sedimented cells into a pre-sterilized storage container containing a blood protective solution,
   stimultaneously mixing the protective solution in the storage container with the blood cells being transferred into the storage container,
   sealing off and severing the transfer line between the container that blood cells are transferred from and the container to which the blood cells are transferred,
   removing the container containing the residual plasma,
   freezing the blood cell-blood protective solution mixture in the storage container,
   storing the frozen mixture under low freezing temperature conditions until needed for reuse,
   thawing the frozen blood-blood protective solution mixture within the storage container,
   placing the storage container with the thawed blood protective solution mixture into a centrifuge assembly,
   sedimenting the blood cells,
   removing the blood protective solution by forcing the blood protective solution into a separate container adjoining the storage container,
   mixing a hypertonic diluting solution with the blood cells to reduce the density of the suspending fluid while rotating the centrifuge,
   washing the blood cells with a suitable wash solution while rotating the centrifuge and expressing the wash solution from the blood storage chamber into a separate chamber,
   displacing any remaining wash solution from the blood storage chamber at the completion of the wash process,
   stopping the centrifuge, and
   transferring the washed blood cells into a separate chamber and mixing the washed blood with a resuspension solution in the separate chamber, whereby the blood is now ready for reuse.

8. A process of treating, storing, and preparing red blood cells for reuse which comprises:
   positioning a mixture of anticoagulant with blood received from a donor in a vertical position until the red blood cells sediment to the downward end of the container into which the blood was received from the donor,
   transferring a portion of the sedimented cells into a pre-sterilized storage container containing a blood protective solution selected from a group consisting of glycerol, dimethyl sulfoxide, glucose, lactose, dextran, or polyvinylpyrrolidone, simultaneously mixing the protective solution in the storage container with the blood cells being transferred into the storage container,
sealing off and severing the transfer tube between the donor blood container and the storage container,
removing the container containing the remaining non-transferred blood plasma,
freezing the blood-blood protective solution mixture in the storage container,
storing the frozen mixture under low freezing temperature conditions until needed for use,
thawing the frozen blood-blood protective solution mixture within the storage container,
securing the container containing the thawed blood-blood protective solution within a centrifuge assembly,
sedimenting the blood cells,
removing the blood protection solution from the mixture by forcing the protection solution in a separate chamber adjoining the storage container,
introducing a hypertonic diluting solution into the storage container and mixing the introduced hypertonic solution with the blood to reduce the density of the suspending fluid while rotating the centrifuge,
washing the blood with a suitable wash solution while rotating the centrifuge and expressing the wash solution and hypertonic diluting solutions into the adjoining chamber,
after sufficient washing, displacing the wash solution from the blood storage container,
closing off all passages into and from the storage container,
stopping the centrifuge,
transferring the washed blood cells into a separate chamber containing a resuspension solution and mixing the blood cells with the resuspension solution, whereby
the blood is now ready for use or short term storage under refrigeration for later use.

9. A process as claimed in claim 8 wherein:
said mixture of anticoagulant with blood received from a donor is sedimented by use of a centrifuge.

No references cited.

M. CARY NELSON, *Primary Examiner.*

H. T. KLINKSIEK, *Assistant Examiner.*